US009256348B2

(12) United States Patent
Belvadi et al.

(10) Patent No.: US 9,256,348 B2
(45) Date of Patent: Feb. 9, 2016

(54) POSTURE CREATION WITH TOOL PICKUP

(71) Applicant: Dassault Systemes DELMIA Corp., Auburn Hills, MI (US)

(72) Inventors: Prasad Belvadi, Bangalore (IN); André Chamberland, Montreal (CA); David Brouillette, Montreal (CA)

(73) Assignee: Dassault Systemes Americas Corp., Waltham, MA (US)

( * ) Notice: Subject to any disclaimer, the term of this patent is extended or adjusted under 35 U.S.C. 154(b) by 244 days.

(21) Appl. No.: 14/133,103

(22) Filed: Dec. 18, 2013

(65) Prior Publication Data

US 2015/0169174 A1 Jun. 18, 2015

(51) Int. Cl.
*G06F 3/0481* (2013.01)
*G06T 19/00* (2011.01)
*G06F 17/30* (2006.01)

(52) U.S. Cl.
CPC ...... *G06F 3/04815* (2013.01); *G06F 17/30061* (2013.01); *G06T 19/003* (2013.01); *G06T 2200/24* (2013.01)

(58) Field of Classification Search
CPC .......... G06F 3/04815; G06F 17/30061; G06T 2200/24; G06T 19/003

USPC ................................. 715/848, 850, 852, 857
See application file for complete search history.

(56) References Cited

U.S. PATENT DOCUMENTS

| | | | |
|---|---|---|---|
| 6,559,870 B1 * | 5/2003 | Anabuki et al. | 715/849 |
| 6,570,563 B1 * | 5/2003 | Honda | 345/419 |
| 8,730,309 B2 * | 5/2014 | Wilson et al. | 348/51 |
| 2003/0219146 A1 * | 11/2003 | Jepson et al. | 382/103 |
| 2006/0115116 A1 * | 6/2006 | Iwasaki et al. | 382/103 |
| 2006/0277466 A1 * | 12/2006 | Anderson | 715/700 |
| 2014/0279192 A1 * | 9/2014 | Selby | 705/26.7 |

* cited by examiner

*Primary Examiner* — Ting Lee
(74) *Attorney, Agent, or Firm* — Hamilton, Brook, Smith & Reynolds, P.C.

(57) ABSTRACT

Computer simulation generates improved 3D images of human movement involving an object associated with the human character. A set of axes in 3 dimensional space is originally defined for tracking orientation of the human character in a 3D image. This set of axes is subsequently automatically applied to and used for object(s) carried by the human character. The object is displayed at a constant (same, unchanged) orientation while the human character is illustrated moving in certain ways in succeeding 3D images.

17 Claims, 7 Drawing Sheets

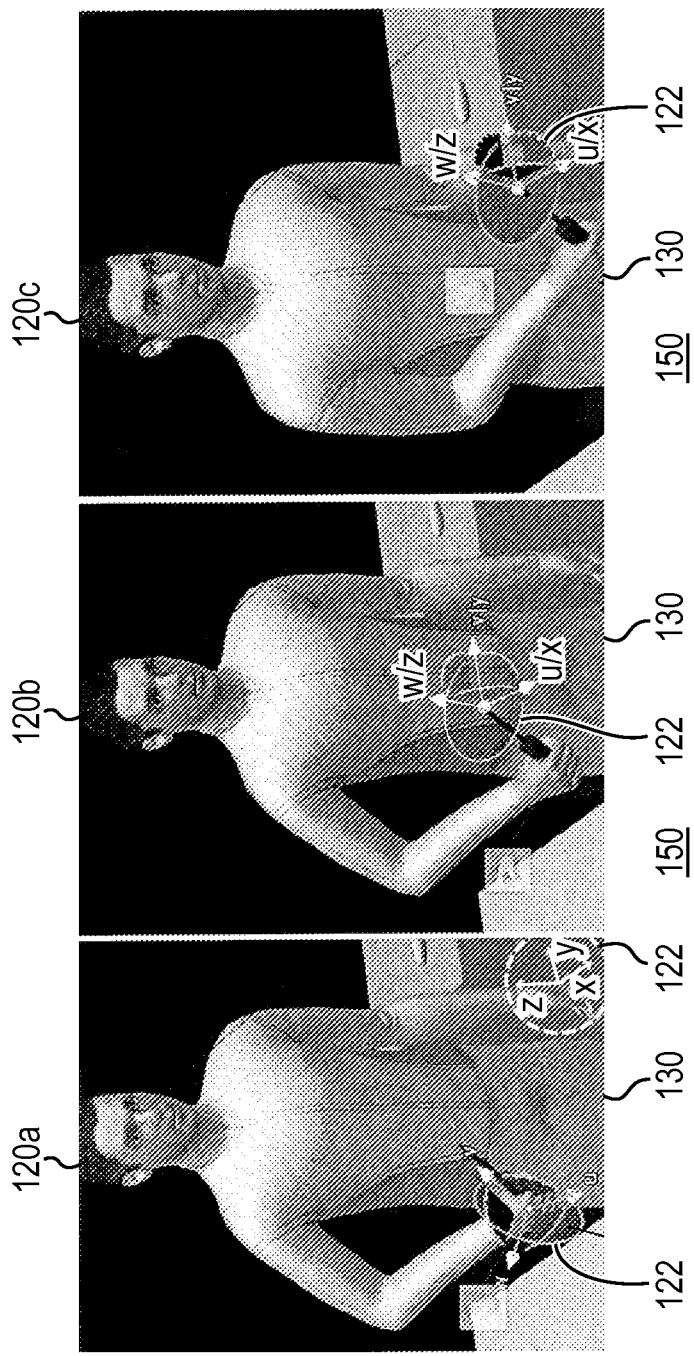

POSTURE CREATION WITH TOOL PICKUP

TECHNICAL FIELD

The present invention relates to the field of 3D human simulation and in particular to 3D images simulating postures of a human holding an object. The 3D human simulation may be for manufacturing scenarios (factory worker simulation), and other field scenarios.

BACKGROUND OF THE INVENTION

In a manufacturing scenario that is targeted by known ergonomics applications, there are several use cases where certain postures (specifically images of postures) have to be created. Namely, the postures having a human character holding an object in hand need to be created. There are tools for manipulating 3D image representation of the arm, but these tools do not maintain the orientation of the object in the hand of the displayed character. As the arm part of the image is manipulated, orientation of the object also gets changed. For example, consider a case where the 3D image is of a human subject with a glass of water in his hand. It is impossible to create images of realistic postures while maintaining the same orientation for the glass from image to image (posture to posture).

SUMMARY OF THE INVENTION

The problem in the art is that there are no intuitive tools to generate postures for the hand by manipulating the selected object itself. There are imaging and simulation tools for just moving hand segments in 3D images. A user of such a tool laboriously creates postures for the hand and then later on adjusts the orientation of the selected object by manipulating the image segments on a trial and error basis. Perfect orientation of the object in an image is not possible. Thus current art mechanisms consume large amounts of time and effort.

Embodiment of the present invention provide a mechanism to manipulate 3D simulation images of the human arm by manipulating the images of a subject or a selected object.

For example, embodiments provide a computer method, apparatus, system and program product of generating 3D images for computer simulations. In a computer-based simulation, embodiments display a 3D image having a subject and a user-selected object. Movement of the subject in the 3D image is defined with respect to a first set of axes in three-dimensional space. Movement of the user-selected object in the 3D image is defined with respect to a second set of axes in three-dimensional space. The displayed 3D image shows an intersection of the subject and the user-selected object. For 3D images succeeding the displayed 3D image in the simulation, embodiments automatically use the first set of axes to define movement of the intersection including movement of the subject and movement of the user-selected object. Embodiments use the first set of axes in a manner omitting use of the second set of axes to define movement of the user-selected object. Such automatic use of the first set of axes results in readily generated further 3D images for the simulation.

In accordance with one aspect of the present invention, the subject is a representation of a human. And the intersection of the subject and the user-selected object is for example at least one hand of the human character carrying the user-selected object. The user-selected object is preferably a real world object.

The resulting further generated 3D images are of the human in different desired postures carrying the user-selected object.

Angle of orientation of the user-selected object is constant in the resulting generated 3D images.

In accordance with another aspect of the present invention, embodiments automatically use the first set of axes by:
temporarily deactivating kinematics functioning of the simulation;
coupling the first set of axes to the user-selected object; and
reactivating the kinematics functioning of the simulation.
The step of coupling further may include aligning the axes of the first set with the axes of the second set.

Computer apparatus embodying the present invention employ a display monitor and a computer-based simulator carrying out the operations, processes and method steps described above.

A computer program product embodying the present invention comprises a non-transitory computer readable medium and program code embodied with the computer readable medium. The program code generates 3D images in a computer-based simulation by causing a computer to perform the foregoing described operations and processes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2a-2c are schematic illustrations of 3D images by simulators embodying the present invention.

DETAILED DESCRIPTION OF THE INVENTION

A description of example embodiments of the invention follows.

The teachings of all patents, published applications and references cited herein are incorporated by reference in their entirety.

Embodiments of the present invention solve the above described technical problem by allowing 3D images of human postures to be created by directly manipulating a user-selected object (or object of interest). The simulated human hand follows the selected object, and the simulator adjusts the hand (or other) segments according to the position and orientation of the selected object at real time.

The principal interesting effect is a faster and easier creation of posture images (3D simulation images) with exact control on the position and orientation of the selected object. In the manufacturing domain where ergonomic applications are deployed, it is very important for 3D images of the human as well as that of the products (objects of interest) to be placed at precise position and orientation.

Figure 1A:
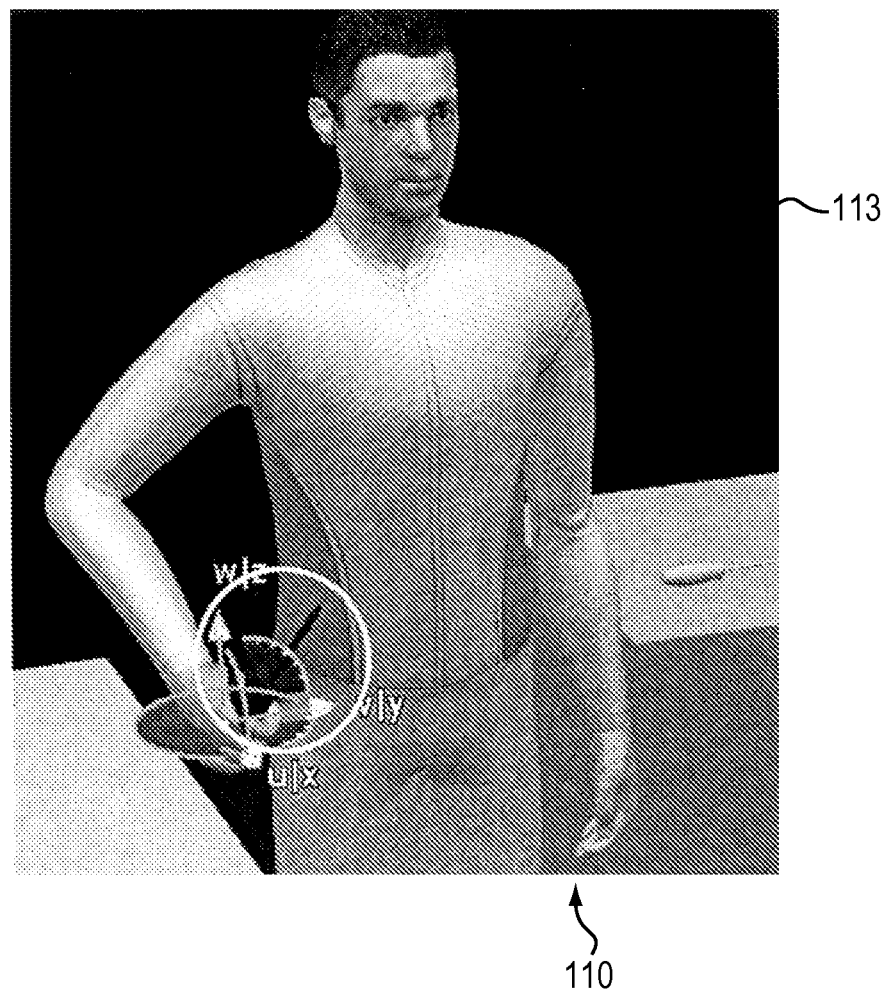
FIGS. 1a-1c are schematic illustrations of prior art simulation images.
Figure 1B:
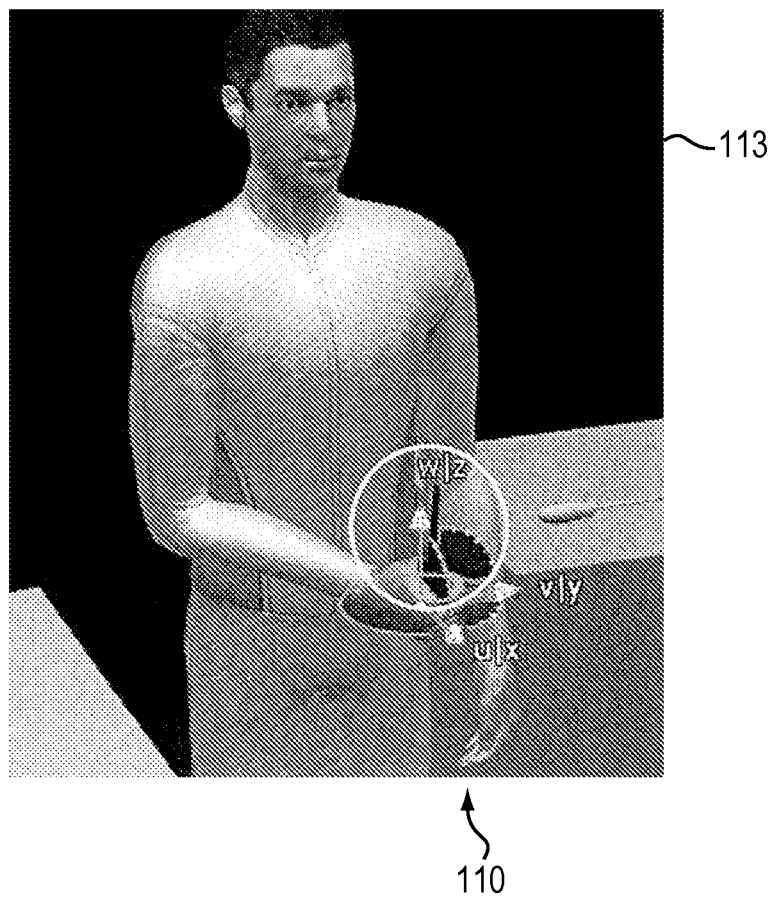
Figure 1C:
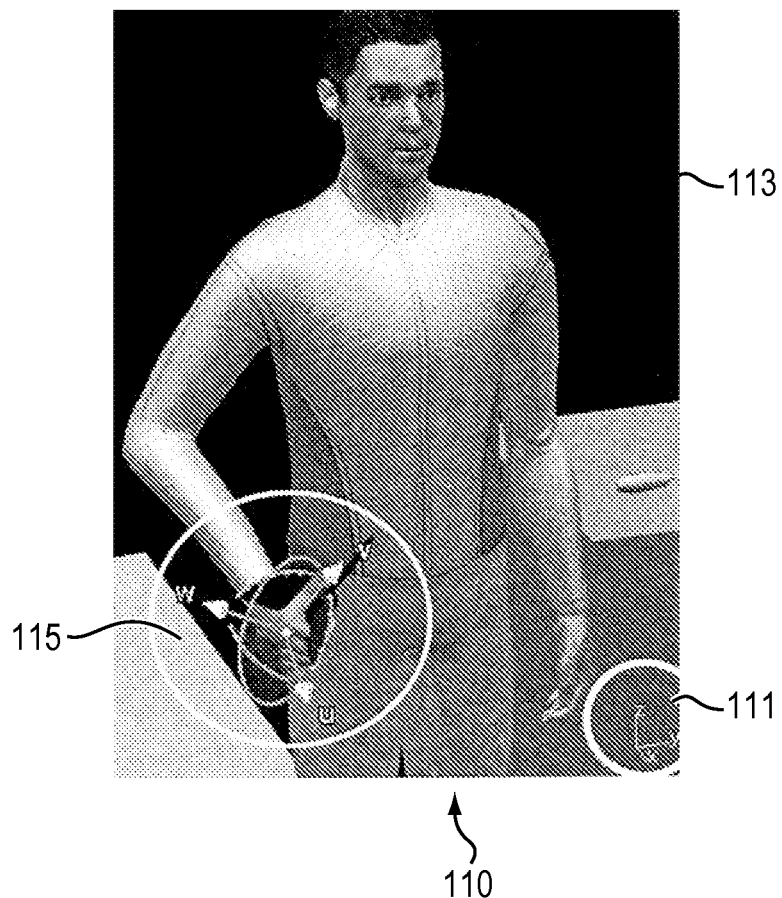

Before the proposed invention, simulators in the art used an inverse kinematics operation or function in simulation images (3D images) 113 of a human subject (also referred to as "robot") 110 as illustrated in FIGS. 1*a*-1*c*. If the hand of the human subject is moved in an image 113, the inverse kinematics worker frame changes orientation of the stick object held in the robot's hand as shown by the circled area in FIGS. 1*a*-1*b*. Notice the stick object changes orientation from a 2 o'clock angle in FIG. 1*a* to about a vertical 12 o'clock orientation in FIG. 1*b*.

Using inverse kinematics segment frame, the compass axes 111 of the human subject 110 (including his hand) are not aligned with the world axes 115 of the stick object held in his hand shown in the larger circle in FIG. 1*c*. Hence, to move the subject hand in the image 113 of FIG. 1*c* in a direction parallel to the ground is very cumbersome and time-consuming requiring translating between the two axes 111, 115 among other adjustments.

In the present invention, the user selects a 3D simulation image 120*a* of the human subject (robot) 130 as illustrated in FIG. 2A. The user turns off or otherwise deactivates the inverse kinematics segment frame function. In one embodiment, this is accomplished by the user selecting the inverse kinematics segment frame operation, then deactivating the inverse kinematics function.

Next the user drags and drops the robot compass 122 on to the selected object held in the hand of the subject/robot 130 and adjusts the robot 130 for desired precise position and/or orientation. The 3D simulation image 120*b* in FIG. 2B is illustrative. As shown in FIG. 2C the user activates (reactivates) the inverse kinematics operation in the simulator 150. The simulator 150 in this mode uses the robot compass 122 in its new placement, i.e., aligned with the selected object (and hence aligned with the orientation of the object and with the object's compass) held in the robot's 130 hand. In this way, the robot compass 122 is reset for a subsequent portion of the simulation.

The user manipulates the selected object (held in the hand of the subject/robot 130) by dragging a pertinent part of the robot 130 in image 120*b*, 120*c*. For example, the right arm of the robot 130 is moved forward in the image 120*c* (of FIG. 2C) from the arm position in image 120*b* in FIG. 2B. In response, the simulator 150 moves the subject hand in the image 120*b*, 120*c*. The orientation of the selected object (held in the hand of the subject/robot 130) remains constant being effectively defined by the robot's compass 122 as reset in FIG. 2B.

Figure 3:
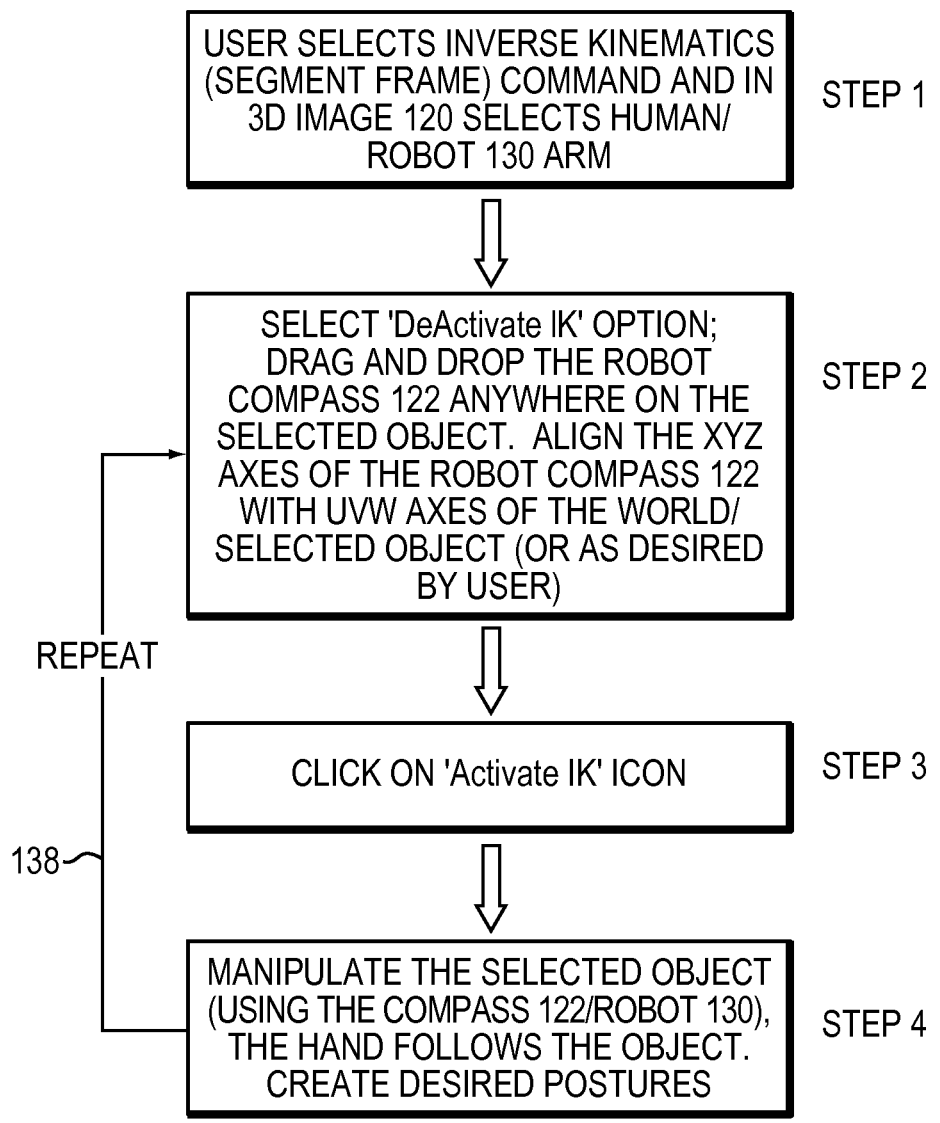
FIG. 3 is a flow diagram of an embodiment.

The simulator 150 and hence simulation process, is configured as illustrated in FIG. 3.

In step 1 of FIG. 3, and using simulator 150, a user select the inverse kinematics segment frame command and in a 3D image 120 select the human subject's/robot's 130 arm. In particular, simulator 150 is responsive to the user selecting a 3D simulation image 120 showing a real world product or object of interest. In the example in FIGS. 2A-2C, the object of interest is the handled object held in the image character's hand (and referred to as the selected object).

Continuing with Step 2 in FIG. 3, simulator 150 enables the user to deactivate the inverse kinematics function enabling the user to reset the robot's compass 122 without ill effect on the current simulation image 120. Next, simulator 150 is responsive to the user dragging and dropping the robot compass 122 anywhere about the selected object/object of interest in the image 120. In turn, simulator 150 enables the user to align the XYZ axes of the robot compass 122 with the UVW axes of the selected object compass as shown in FIGS. 2A-2C. This serves to operatively couple or otherwise map the robot compass 122 to the selected object.

Next at step 3, the user reactivates the inverse kinematics segment frame function. Responsively, the simulator 150 in Step 4 enables the user to manipulate in the 3D image 120 the robot 130 and in particular the hand holding the object of interest using the robot compass 122. By manipulating or moving the hand in simulation image 120, the simulator 150 likewise moves the object held in that hand, and vice versa. In this way, the user effectively manipulates the selected object using the robot's compass 122 instead of (or in substitution of) the object's compass.

This allows the user to create images of desired postures of the human subject/robot 130 with correctly oriented associated real world object(s), such as user-selected/desired objects held in the hand(s) of the robot 130. Via Loop 138, the user/simulation process 150 repeat steps 2-4 to create various 3D images of the human subject 130 in the different desired postures.

Figure 4:
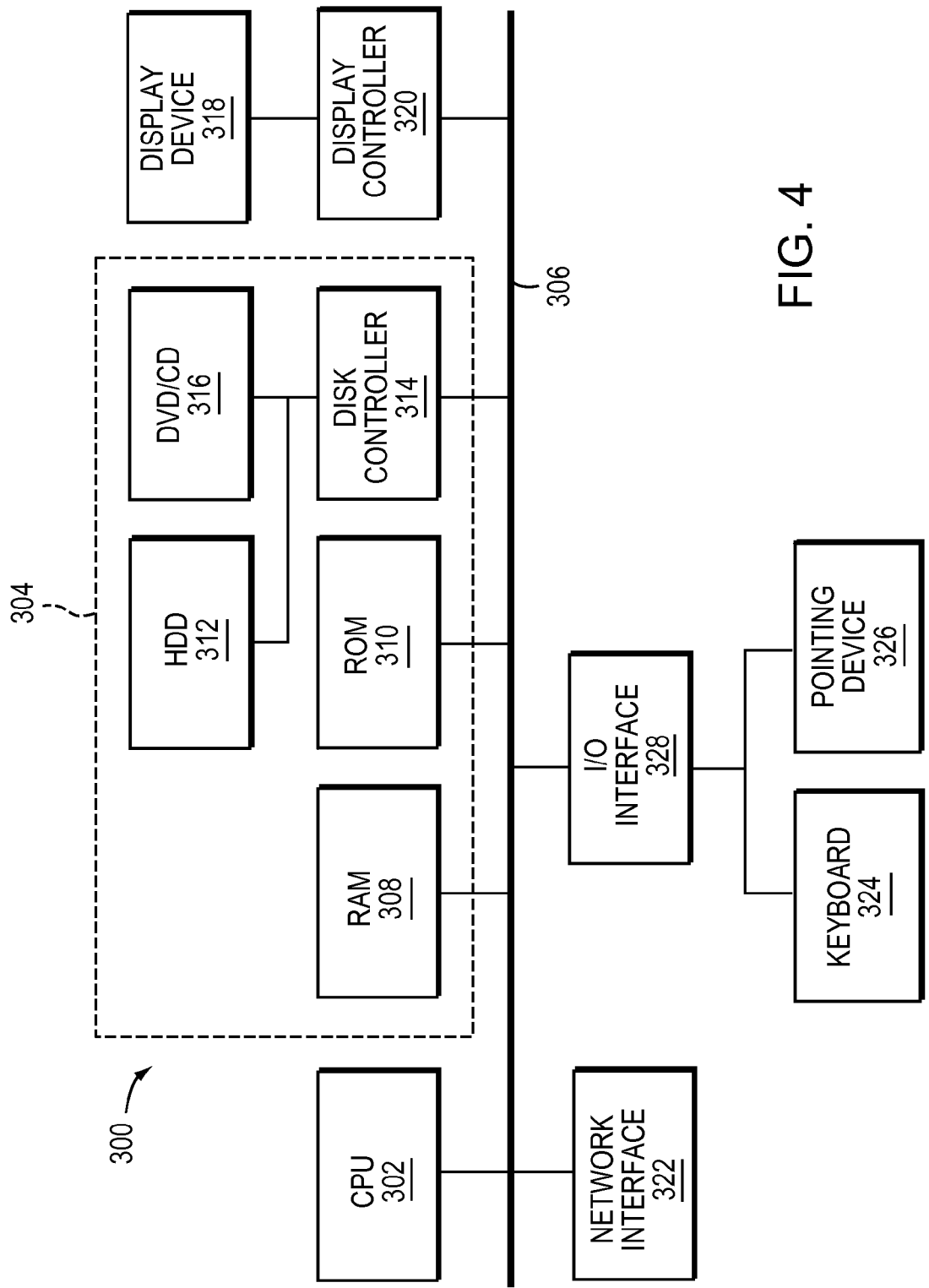
FIG. 4 is a block diagram of a computer system embodying the present invention.

FIG. 4 is a schematic block diagram of an exemplary computer-aided design station 300, which may also be referred to herein as a computer system. As used herein, the terms "computer-aided design station" and "computer system" refer generally to any suitable computing device that may be used to perform the processes described above and/or any additional processes that may be related to those described above.

In an exemplary embodiment, the computer-aided design station 300 includes one or more processors 302 (CPU) that performs the processes described above (e.g., simulator process 150 of FIG. 3) and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 304 that is operably and/or communicatively coupled to the processor 302 by a system bus 306. A "memory area," as used herein, refers generally to any means of storing program code and instructions executable by one or more processors to aid in automatically using a robot compass in manipulating one or more selected objects using a 3D simulator. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-erasable programmable read-only memory (EEPROM). Any other suitable magnetic, optical, and/or semiconductor memory, such as a hard-disk drive (HDD) 312, by itself or in combination with other forms of memory, may be included in the memory area 304. HDD 312 may also be coupled to a disk controller 314 for use in transmitting and receiving messages to and from processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer-aided design station 300 also includes a display device 318 that is coupled, such as operably coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only and, thus, are not intended to limit in any way the definition and/or meaning of the term "display device."

In addition, the computer-aided design station 300 includes a network interface 322 for use in communicating with a network (not shown in FIG. 4). Moreover, the computer-aided design station 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

Figure 5:
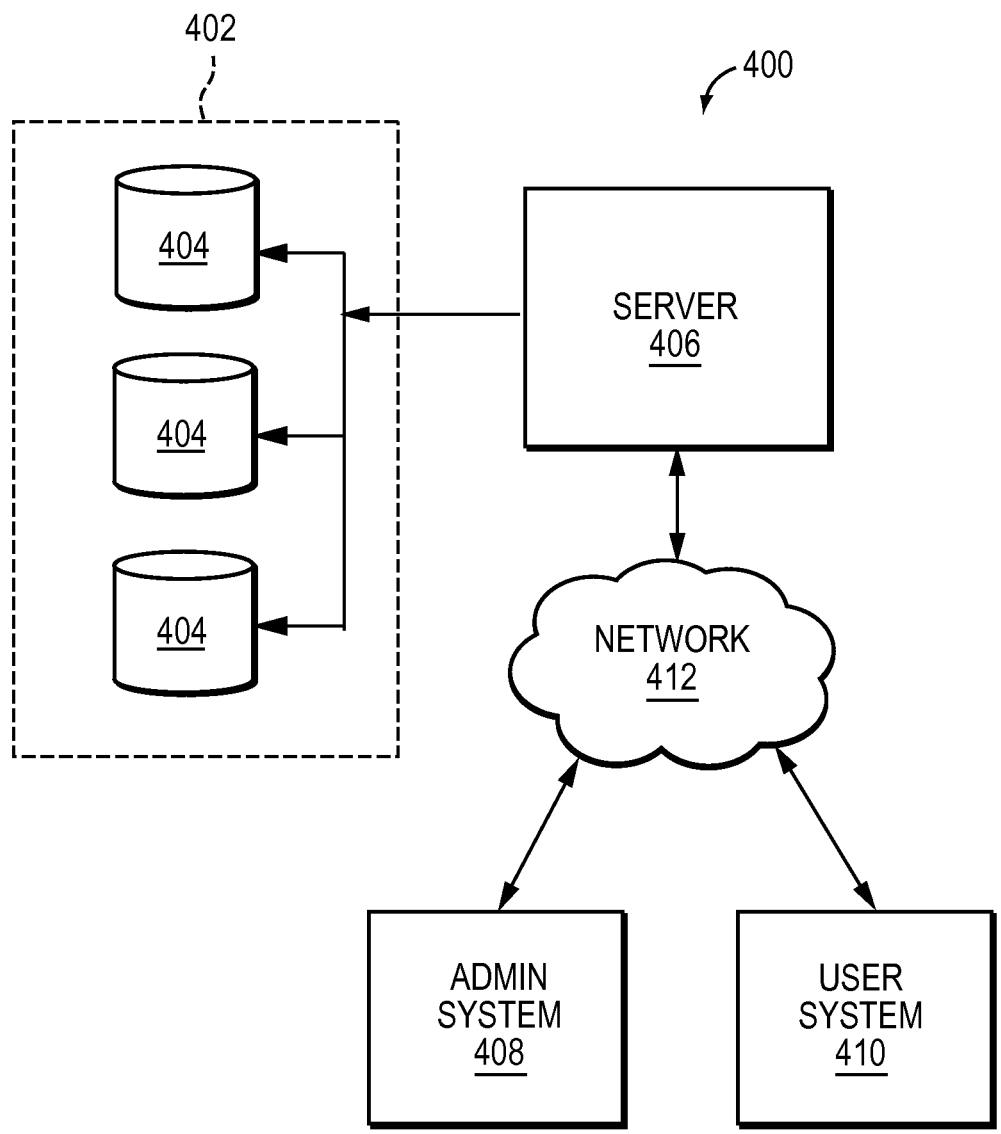
FIG. 5 is a block diagram of a computer network embodying the present invention.

FIG. 5 is a schematic block diagram of an exemplary system 400 for use in computer-aided design of a simulated object, such as the 3D simulator 150 described above and/or additional processes that may be related to those described above. In an exemplary embodiment, a memory area 402 includes one or more storage devices 404 for use in storing simulation data, such as robot 130 data, robot compass 122 data, object compass data and/or object data and/or simulation process 150 data.

In some embodiments, the memory area 402 is coupled to a server 406, which is in turn coupled to an administrator system 408 and/or a user system 410 via a network 412. The storage devices 404 may be embodied as one or more databases, may be located at a single or at multiple geographical sites, or may be integrated with the server 406.

As can be appreciated, the network 412 can be a public network, such as the Internet, or a private network such as an LAN or WAN network, or any combination thereof and can also include PSTN or ISDN sub-networks. The network 412 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 412 is merely exemplary and in no way limits the scope of the present advancements.

As one of ordinary skill in the art would recognize, the administrator system 408 and/or the user system 410 can be a computer-aided design station such as the one described above with reference to FIG. 4, or any other computing system that is known. Moreover, it should be understood that the administrator system 408 and/or the user system 410 are configured to perform the processes described above and/or any additional processes that may be related to those described above.

The server 406 stores the computer-readable instructions to execute the simulator processes 150 (FIG. 3) described above and provides these instructions via the network 412 to the administrator system 408 and/or the user system 410. Moreover, the server 406 can also provide data from the memory area 402 as needed to the administrator system 408 and the user system 410. As such, FIG. 5 includes implementations of the system 400 via cloud computing, distributed computing and the like.

Exemplary embodiments of systems, methods, apparatus, computer program products, and non-transitory computer-readable storage media for use in 3D simulation and computer-aided design of a modeled or simulated subject and associated real-world object are described above in detail. The systems, methods, apparatus, computer program products, and computer-readable storage media are not limited to the specific embodiments described herein but, rather, operations of the methods, program products and/or storage media, as well as components of the system and/or apparatus, may be utilized independently and separately from other operations and/or components described herein. Further, the described operations and/or components may also be defined in, or used in combination with, other systems, methods, apparatus, program products and/or storage media, and are not limited to practice with only the systems, methods, apparatus, program products and storage media as described herein.

A computer or computer system, such as those described herein, includes at least one processor or processing unit and a system memory. The computer or computer system typically has at least some form of non-transitory computer readable media. By way of example and not limitation, non-transitory computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well-known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of non-transitory components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A method of generating 3D images for computer simulation, in a computer-based simulation, comprising:
    displaying a 3D image having a subject and a user-selected object, movement of the subject in the 3D image being defined with respect to a first set of axes in 3 dimensional space, and movement of the user-selected object in the 3D image being defined with respect to a second set of axes in 3 dimensional space, the displayed 3D image showing an intersection of the subject and the user-selected object; and
    for images succeeding the displayed 3D image in the simulation, automatically using the first set of axes to define movement of the intersection including movement of the subject and movement of the user-selected object, in a manner omitting use of the second set of axes to define movement of the user-selected object, said automatic using the first set of axes resulting in further generated 3D images for the simulation, wherein the step of automatically using the first set of axes further includes:
    temporarily deactivating kinematics functioning of the simulation;
    coupling the first set of axes to the user-selected object;
    aligning the axes of the first set with that of the second set; and
    re-activating the kinematics functioning of the simulation.

2. A method as in claim 1 wherein the subject is a representation of a human.

3. A method as in claim 2 wherein the intersection of the subject and the user-selected object is the representation of the human carrying the user-selected object.

4. A method as in claim 2 wherein the intersection of the subject and the user-selected object is at least one hand of the human carrying the user-selected object.

5. A method as in claim 4 wherein the further generated 3D images are of the human in different desired postures carrying the user-selected object.

6. The method as in claim 2 wherein the further generated 3D images are of the human in different desired postures.

7. A method as in claim 1 wherein angle of orientation of the user-selected object is constant in the resulting further generated 3D images.

8. A method as in claim 1 wherein the user-selected object is a real world object.

9. A computer apparatus generating 3D images for computer simulations comprising:
    a display monitor; and
    a computer-based simulator configured to:
    display on the display monitor a 3D image having a subject and a user-selected object, movement of the subject in the 3D image being defined with respect to a first set of axes in 3 dimensional space, and movement of the user-selected object in the 3D image being defined with respect to a second set of axes in 3 dimensional space, the displayed 3D image showing an intersection of the subject and the user-selected object; and
    for images succeeding the displayed 3D image in the simulation, automatically use the first set of axes to define movement of the intersection including movement of the subject and movement of the user-selected object, in a manner omitting use of the second set of axes to define movement of the user-selected object, and resulting in further generated 3D images for simulation, wherein automatically use the first set of axes includes:
    temporarily deactivate kinematics functioning of the simulation;
    couple the first set of axes to the user-selected object;
    align the axes of the first set with that of the second set; and
    re-activate the kinematics functioning of the simulation.

10. A computer apparatus as claimed in claim 9 wherein the subject is a representation of a human.

11. A computer apparatus as claimed in claim 10 wherein the intersection of the subject and the user-selected object is the representation of the human carrying the user-selected object.

12. A computer apparatus as claimed in claim 10 wherein the intersection of the subject and the user-selected object is at least one hand of the human carrying the user-selected object.

13. A computer apparatus as claimed in claim 12 wherein the further generated 3D images are of the human in different desired postures carrying the user-selected object.

14. A computer apparatus as claimed in claim 10 wherein the further generated 3D images are of the human in different desired postures.

15. A computer apparatus as claimed in claim 9 wherein angle of orientation of the user-selected object is constant in the resulting further generated 3D images.

16. A computer apparatus as claimed in claim 9 wherein the user-selected object is a real world object.

17. A computer program product comprising:
    a non-transitory computer readable medium; and
    program code embodied with the computer readable medium for generating 3D images in a computer based simulation, when executed by a digital processor, the program code causing:

a computer to display a 3D image having a subject and a user-selected object, movement of the subject in the 3D image being defined with respect to a first set of axes in 3D space, and movement of the user-selected object in the 3D image being defined with respect to a second set of axes in 3D space, the displayed 3D image showing an intersection of the subject and the user-selected object; and a processor to automatically use, for images succeeding the displayed 3D image in the simulation, the first set of axes to define movement of the intersection including movement of the subject and movement of the user-selected object, in a manner resulting in further generated 3D images for the simulation, wherein automatically use the first set of axes includes:

temporarily deactivate kinematics functioning of the simulation;

couple the first set of axes to the user-selected object;

align the axes of the first set with that of the second set; and re-activate the kinematics functioning of the simulation.

\* \* \* \* \*